United States Patent [19]
Doering

[11] 3,923,340
[45] Dec. 2, 1975

[54] DEBRIS CONTAINING DEVICE

[75] Inventor: Charles W. Doering, Clarksville, Ind.

[73] Assignee: Brinly-Hardy Co., Inc., Louisville, Ky.

[22] Filed: May 6, 1974

[21] Appl. No.: 467,395

Related U.S. Application Data

[62] Division of Ser. No. 342,166, March 16, 1973, Pat. No. 3,849,824.

[52] U.S. Cl. .................................. 298/10; 298/10 X
[51] Int. Cl.² ............................................ B60N 1/28
[58] Field of Search ........................... 298/24, 25, 10

[56] References Cited
UNITED STATES PATENTS
2,399,718  5/1946  Baker .............................. 298/10 X

*Primary Examiner*—Robert J. Spar
*Assistant Examiner*—George F. Abraham
*Attorney, Agent, or Firm*—Frank C. Leach, Jr.

[57] ABSTRACT

Debris, which is collected from a lawn, for example, is compressed prior to being supplied to a bag by rotatably mounted compactor blades rotating between stripper bars, which substantially strip the debris from the blades. The debris may be picked up by rotatably mounted wires, which pass between stripper bars, so that the debris is substantially removed from the wires by the stripper bars prior to the debris being directed to the compactor blades.

10 Claims, 5 Drawing Figures

DEBRIS CONTAINING DEVICE

This application is a division of application Ser. No. 342,166, filed Mar. 16, 1973, now U.S. Pat. No. 3,849,824.

In the copending patent application of Charles W. Doering and Samuel W. Smith for "Rotary Brush Sweeper And Bagger," Ser. No. 331,694, filed Feb. 12, 1973, which now U.S. Pat. No. 3,849,685, is a continuation of abandoned application Ser. No. 195,607, filed Nov. 4, 1971, there is shown an apparatus for picking up debris and then compressing the debris through utilization of rollers prior to the debris being supplied to a collecting bag. In my copending application for "Debris Collecting Apparatus," Ser. No. 268,064, filed June 30, 1972, now U.S. Pat. No. 3,841,043 there is shown another arrangement for compressing debris prior to it being supplied to a collecting bag. In this arrangement, a rotatably mounted compression roller has fins movable in and out of orifices in the roller by a crankshaft.

The present invention utilizes another arrangement for compressing debris which has been picked up. In the apparatus of the present invention, stripper means, which are preferably a plurality of U-shaped stripper bars, are located between rotatably mounted compactor blades and disposed relative to the path of travel of the compactor blades and a surrounding housing so that the blades rotate in a rotary path about a horizontal axis while having both compression of the debris and stripping of the debris from the compactor blades after the debris has been advanced to a debris confining chamber.

The apparatus of the present invention also contemplates a pivotally mounted cover cooperating with the debris pick-up means to enable the cover to float relative to the pick-up means to accommodate relatively heavy loads of debris. Thus, any tendency for the pick-up means to be prevented from rotating by debris lodging within a fixed cover is eliminated.

An object of this invention is to provide a device for containing debris.

Other objects of this invention will be readily perceived from the following description, claims, and drawings.

This invention relates to a debris containing device for a debris collector having an outlet in a housing defined by an upwardly extending rim through which debris is pushed upwardly by accumulation of debris therebelow. The device comprises a hopper having an increasing cross sectional area from its bottom to its top. The hopper has an opening at its top and an opening at its bottom for communication with the outlet in the housing when in a position to receive debris from the outlet in the housing. Means pivotally mounts the hopper for movement relative to the housing to move the bottom opening in the hopper away from its communication with the outlet in the housing to a position in which debris may fall from the hopper through the top opening of the hopper by gravity.

The attached drawings illustrate a preferred embodiment of the invention, in which.

Figure 1:
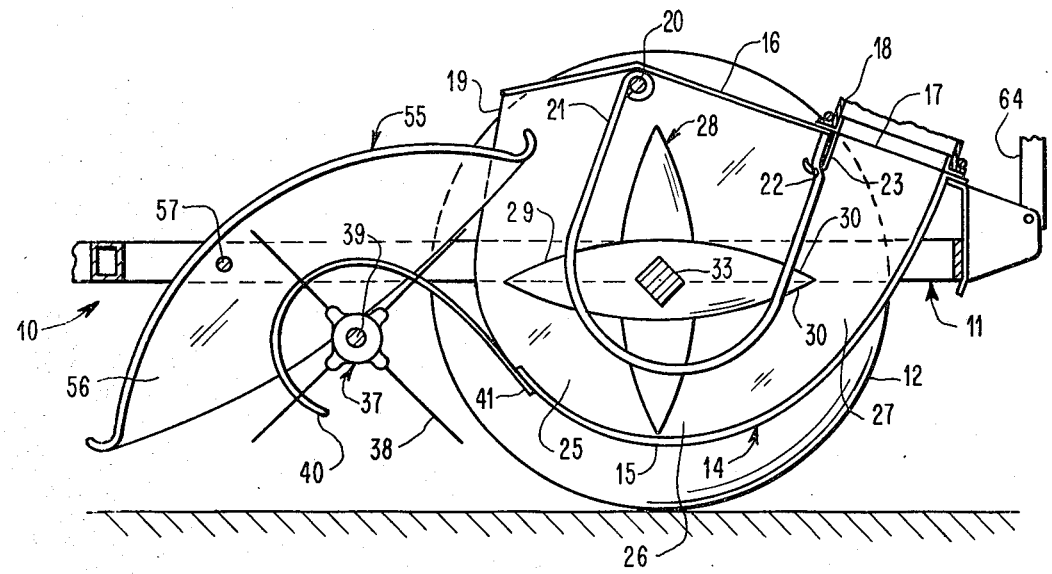
FIG. 1 is a side elevational view, partly in section, of a portion of the apparatus of the present invention.

Referring to the drawings and particularly FIG. 1, there is shown a portion of a debris collecting apparatus 10. The apparatus 10 includes a frame or chassis 11, which is substantially rectangular shaped. Wheels 12 (one shown) are rotatably supported on opposite sides of the frame 11 whereby the frame 11 may be pulled by a tractor, for example, as more particularly shown and described in the aforesaid Doering et al. patent application and my aforesaid patent application.

The frame 11 has a housing 14 supported thereby. The housing 14 includes a curved bottom wall 15 and a top wall 16. A debris discharge outlet 17 is formed adjacent the junction of the walls 15 and 16. The outlet 17 is adapted to receive a debris containing device such as a bag 18, which collects the debris, in the manner more particularly shown and described in the aforesaid Doering et al patent application and my aforesaid patent application.

The housing 14 includes a pair of end plates 19, which are joined to opposite ends of the walls 15 and 16 and to opposite sides of the frame 11. A rod 20 extends between the end plates 19 to support one end of a plurality of U-shaped stripper bars 21 within the housing 14. The other end of each of the U-shaped stripper bars 21 is disposed within a slot or opening 22 of a downwardly depending flange 23 of the top wall 16 of the housing 14.

The flange 23 has the same number of the slots or openings 22 therein as there are the stripper bars 21. Thus, each of the stripper bars 21 is disposed within a separate one of the slots or openings 22.

Figure 2:
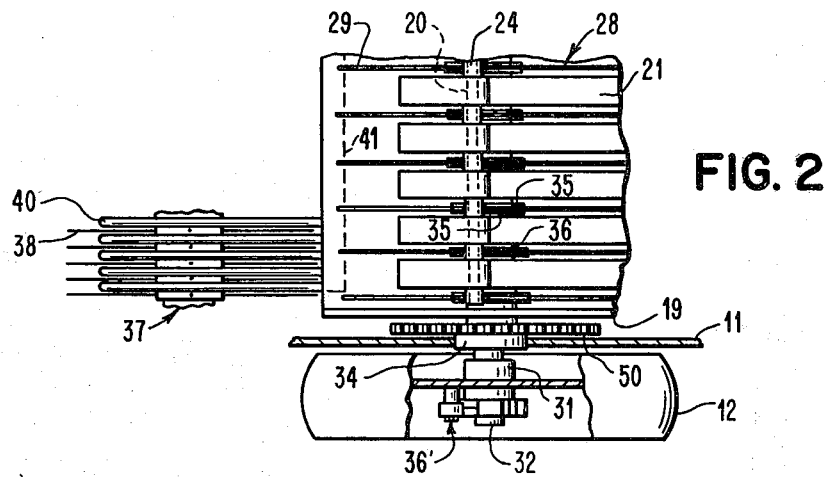
FIG. 2 is a fragmentary top plan view of a portion of the apparatus of FIG. 1.

The slots or openings 22 along with spacers 24 on the rod 20, which is releasably connected to each of the pair of end plates 19, enable the stripper bars 21 to be separated from each other a predetermined distance. As shown in FIG. 2, the spacers 24 are disposed between each adjacent pair of the stripper bars 21.

The stripper bars 21 are so disposed within the housing 14 that they cooperate with the bottom wall 15 of the housing 14 to provide a receiving means or chamber 25 within which the debris is received, a compression chamber 26, which is the smallest cross sectional area formed between the stripper bars 21 and the bottom wall 15 of the housing 14, and a debris confining chamber 27. The debris confining chamber 27 connects the compression chamber 26 with the discharge outlet 17 and has an increasing cross sectional area from the compression chamber 26 to the discharge outlet 17 because of the stripper bars 21 and the bottom wall 15 of the housing 14 diverging away from each other.

The debris is advanced from the receiving means or chamber 25 through the compression chamber 26 to the debris confining chamber 27 by a plurality of rotatably mounted compactor blades 28. As shown in FIG. 2, each of the blades 28 is disposed between an adjacent pair of the stripper bars 21 with a minimum clearance therebetween.

The substantially horizontal, rotary axis of the compactor blades 28 and the stripper bars 21 are located relative to each other so that each blade 29 of each of the compactor blades 28 ceases to extend into the debris confining chamber 27 approximately 90° after leaving the compression chamber 26 and enters between the confines of the legs of the U-shaped stripper bars 21. The location of the U-shaped stripper bars 21 on each side of each of the compactor blades 28 aids in stripping the debris from the blades 29 of the compactor blade 28. Each of the blades 29 passes outside of the confines of the legs of the U-shaped stripper bars 21 prior to entering the receiving means or chamber 25.

Each of the blades 29 has a curved surface 30 at its end. The curved surface 30 enables the debris to be more easily stripped from the blade 29 by the stripper bars 21.

The curved surface 30 is shaped to push material away as it passes between the stripper bars 21 on each side thereof. This is accomplished by the angle relation of the blade 29 to the stripper bar 21 always being greater than 90° so as not to pull the debris through the stripper bars 21.

Each of the wheels 12 includes a hub 31, which is rotatably supported on a round end 32 of a drive shaft 33, which is square shaped between its round ends. The ends 32 of the drive shaft 33 extend from opposite sides of the frame 11 in which the drive shaft 33 is rotatably supported by bearings 34 (one shown).

The compactor blades 28 are secured to the square shaped portion of the drive shaft 33. Each of the compactor blades 28 includes two separate members 35 with each of the members 35 having two of the blades 29 diametrically disposed to each other. Each of the members 35 has a square shaped opening for disposition on the square shaped portion of the drive shaft 33. Tubular spacers 36 are disposed between each of the compactor blades 28 to maintain the desired spacing therebetween. Each of the members 35 of each of the compactor blades 28 is designed with an off-set at its center to keep the tips of all of the blades 29 of each of the compactor blades 28 in the same plane whereby the opening between the adjacent stripper bars 21 is maintained at a minimum.

One of the round ends 32 of the drive shaft 33 is connected to one of the wheels 12 by a suitable one-way clutch 36', which is preferably the pawl drive arrangement shown and described in my aforesaid patent application. Accordingly, there is drive from the wheels 12 to the compactor blades 28 so that the compactor blades 28 are rotated only when the frame 11 is advanced.

The debris, which is supplied to the receiving means or chamber 25, may be directed thereto in any suitable manner. For example, the debris could be supplied from one or more lawn mowers in the manner shown and described in my aforesaid patent application.

However, the debris is preferably supplied to the receiving means or chamber 25 from a debris pick-up means. While the debris pick-up means may be the brush type, for example, shown in the aforesaid Doering et al. patent application, it preferably is a wire pick-up reel 37, which is supported by the frame 11.

The wire pick-up reel 37 is preferably similar to the type shown and described in my copending application for "Fingers For Thatching Apparatus," Ser. No. 306,353, filed Nov. 13, 1972, now abandoned. As shown and described in my aforesaid patent application, Ser. No. 306,353, the pick-up reel 37 includes a plurality of wires 38, which are supported in molded rubber sections fixed to a hollow shaft 39 by bolts, for example.

Each segment of the rubber molded section has a plurality of the wires 38 arranged thereon in spaced relation in the direction of the longitudinal axis of the shaft 39 as shown in FIG. 2. Accordingly, a plurality of sets of the wires 38 is disposed along the length of the shaft 39 with each set of the wires 38 preferably having four of the wires 38. As shown in FIG. 1, the wires 38 of each set are displaced an equal angular amount from each other so that each of the four wires 38 of each set are 90° from each of the adjacent wires 38. It should be understood that the wires 38 of each set are not necessarily aligned with the wires 38 of the other sets when viewed in the axial direction of the shaft 39. For example, the wires 38 could be arranged in a helix pattern.

The spacing of the sets of the wires 38 enables stripper bars 40 to be disposed between each set of the wires 38 with a minimum clearance between the wires 38 and the adjacent stripper bars 40. The stripper bars 40 are supported on a frame 41, which is fixed to the bottom wall 15 of the housing 14 by any suitable means such as welding, for example.

The rotary path of the ends of the wires 38 is disposed with respect to the configuration and location of the stripper bars 40 so that the debris is stripped from the wires 38 by the stripper bars 40 just prior to the debris entering the receiving means or chamber 25. Thus, as the wires 38 rotate clockwise, the debris is picked-up from the ground by the wires 38 and advanced to the receiving means or chamber 25.

Figure 3:
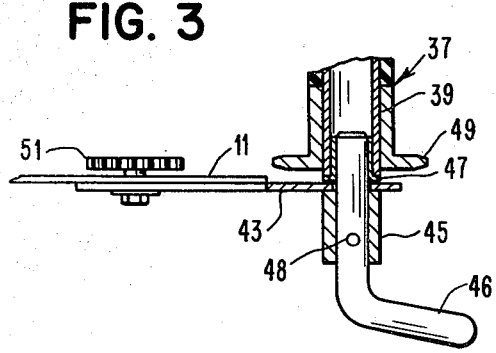
FIG. 3 is a top plan view, partly in section, showing the support structure for one end of the pick-up means with the chain omitted and taken along line 3—3 of FIG. 4.

The wire pick-up reel 37 is rotatably supported by the frame 11. The frame 11 has a plate 43 (see FIG. 3) secured to opposite sides of the frame 11. Each of the plates 43 has a collar 45 fixed thereto to receive a connecting pin 46. The connecting pin 46 extends through the collar 45 and into a bushing 47, which is fixed to the interior of the hollow shaft 39. Accordingly, the shaft 39 rotates about the connecting pins 46 at each end thereof.

Each of the connecting pins 46 is removably retained within the cooperating collar 45 by a cotter pin, for example, extending through an opening 48 in the pin 46 and aligned openings in the collar 45. Thus, the pins 46 function as a rotatable support for the shaft 39 of the pick-up reel 37.

The shaft 39 of the reel 37 is rotated from the wheels 12 through a chain drive. Accordingly, whenever the frame 11 is advanced, the wires 38 of the pick-up reel 37 are rotated to pick-up debris.

The chain drive includes a driven sprocket 49, which is fixed to one end of the shaft 39, and a driving sprocket 50 (see FIG. 2), which is supported on the square shaped portion of the drive shaft 33 of the compactor blades 28. Since the shaft 33 is driven only when the wheels 12 are rotated to advance the frame 11, the sprocket 50 is turned only at this time. Thus, when the wheels 12 are not advanced, there is no rotation of the pick-up reel 37.

Figure 4:
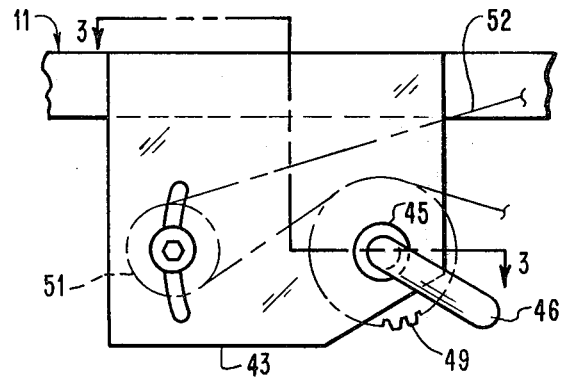
FIG. 4 is a fragmentary side elevational view of a portion of the apparatus of FIG. 1 and showing a portion of the chain drive arrangement between the pick-up means and the compactor blades of the compression means of the apparatus of FIG. 1.

The chain drive also includes an idler sprocket 51 (see FIG. 3), which is rotatably supported by one of the plates 43 of the frame 11, and a chain 52 (see FIG. 4). The chain 52 passes around the sprockets 50 and 51 but only over the top of the sprocket 49. As a result, the sprocket 49 is rotated in the opposite direction to the sprocket 50 whereby the wires 38 rotate clockwise while the wheels 12 rotate counterclockwise to advance the frame 11.

A cover 55 (see FIG. 1) cooperates with the wires 38 of the wire pick-up reel 37 to direct the debris to the receiving means or chamber 25. The cover 55 has its end plates 56 pivotally connected to opposite sides of the frame 11 by spring loaded L-shaped pivot pins 57 being disposed in openings in the frame 11. Accordingly, the cover 55 can pivot counterclockwise about the pins 57 to accommodate heavy loads of debris to prevent blocking by the debris of the area formed between the cover 55 and the stripper bars 40. The frame 11 has a plurality of openings in each of its sides to enable the pivot pins 57 to be disposed at different locations to change the pivot position of the cover 55.

The frame 11 can be pushed by an operator, self-propelled, or pulled by a tractor or the like. When pulled by a tractor or the like, the frame 11 preferably has a braced tongue attached to the front of the frame 11 in the manner more particularly shown and described in the aforesaid Doering et al patent application and my aforesaid patent application, Ser. No. 268,064, with an adjustable height means employed in conjunction therewith as more particularly shown and described in the aforesaid Doering et al. patent application and my aforesaid patent application, Ser. No. 268,064.

Considering the operation of the apparatus of the present invention, the debris is picked-up by the wires 38 of the reel 37 as the frame 11 is advanced. The clockwise rotation of the wires 38 directs the debris to the receiving means or chamber 25 with the debris being stripped from the wires 38 by the stripper bars 40 just prior to the debris entering the receiving means or chamber 25. The compactor blades 28 are rotating counterclockwise and advance the debris from the receiving means or chamber 25 to the compression chamber 25 and from the compression chamber 26 to the debris confining chamber 27.

As the debris is advanced from the compression chamber 26 to the debris confining chamber 27, the debris confining chamber 27 fills up. As the debris continues to be advanced from the compression chamber 26 to the debris confining chamber 27 by the compactor blades 28, the debris is eventually forced through the discharge outlet 17 into the bag 18. This pushing of the debris into the debris confining chamber 27 prior to its discharge through the outlet 17 compacts the debris so that the bag 18 holds much more debris than would normally be expected.

While the present invention has shown and described the pick-up reel 37 as being driven through a chain drive, it should be understood that any other suitable means could be employed for driving the reel 37. For example, a friction drive from one of the wheels 12 to a friction roller on the pick-up reel 37 could be employed. To prevent rotation of the pick-up reel 37 in the opposite direction when the frame 11 is backed up, it would be necessary to include a one-way clutch to connect the friction roller to the shaft 39 of the pick-up reel 37, for example. Any other suitable means for driving the pick-up reel 37 only when the frame 11 is advanced could be employed if desired.

While the pick-up reel 37 has been described as being the type shown and described in my aforesaid patent application, Ser. No. 306,353, so that thatching occurs when using the pick-up reel 37, it should be understood that such is not necessary. Thus, the pick-up reel 37 could be replaced by any other suitable debris pick-up means, which may not thatch.

Figure 5:
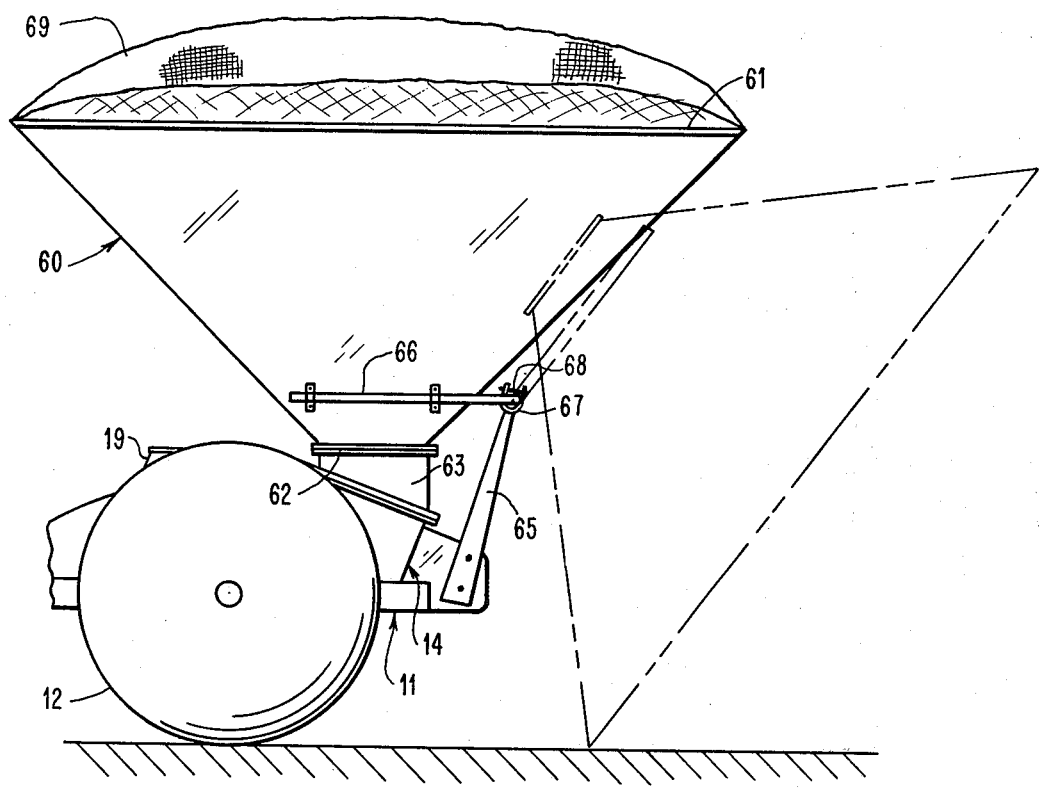
FIG. 5 is a side elevational view of a portion of the apparatus of FIG. 1 showing another form of debris containing device.

While the debris containing device has been shown and described as being the bag 18, it should be understood that any other type of suitable debris containing device could be employed. For example, the bag 18 could be replaced by a hopper 60 (see FIG. 5). The hopper 60 could have a pyramid shape with its top 61 having an opening and its bottom 62 having an opening.

When the hopper 60 is in the position to receive the debris from the outlet 17, the opening in the bottom 62 of the hopper 60 communicates with the outlet 17 through a coupling 63, which is secured to the housing 14, so that the debris may be forced into the hopper 60. Instead of utilizing arms 64 (see FIG. 1), which are pivotally mounted on the frame 11 to support the bag supporting frame in the manner more particularly shown and described in the aforesaid Doering et al. application, the arms 64 would be replaced by a pair of support straps 65 on opposite sides of the frame 11.

At the upper ends of the straps 65, the hopper 60 is pivotally mounted by means of a tubular member 66, which extends around three sides of the hopper 60. The tubular member 66 has the portion on its back side pivotally supported in a clevis 67 which is fixed to the top of each of the straps 65 so that the hopper 60 can pivot from the solid line position of FIG. 5 in which it receives the debris to the phantom line position of FIG. 5 in which the debris can fall from the hopper by gravity through the opening in the top 61 of the hopper 60. The tubular member 66 is retained within each of the clevises 67 by a pin 68.

Accordingly, the pivot point of the hopper 60 is disposed above the outlet 17. This enables pivoting of the hopper 60 to the position in which the debris may fall by gravity from the hopper 60 through the opening at the top 61.

If desired, a cover 69 is releasably secured to the top 61 of the hopper 60. The cover 69, which is preferably formed of a porous or screen type material, enables the capacity of debris contained within the hopper 60 to be increased almost double. This results in the need for less frequent stopping of the debris collecting apparatus 10 to remove the debris from the hopper 60.

An advantage of this invention is that more debris can be placed in the bag. Another advantage of this invention is that it is relatively light weight.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A debris containing device for a debris collector having an outlet in a housing defined by an upwardly extending rim through which debris is pushed upwardly by accumulation of debris therebelow comprising a hopper formed of a plurality of walls, said hopper having an opening at its top defined by the upper ends of said walls, said hopper having an opening at its bottom for communication with the outlet in the housing when in a position to receive debris from the outlet in the housing into the bottom of said hopper so that the debris is pushed upwardly into said hopper, said bottom opening being defined by the lower ends of said walls, said hopper having an increasing cross sectional area from said bottom opening to said top opening, and means to pivotally mount said hopper for movement relative to the housing to move said bottom opening in said hopper away from its communication with the outlet in the housing to a position in which debris may fall from said hopper through said top opening of said hopper by gravity.

2. The debris containing device according to claim 1 in which said pivotal mounting means has its pivot above the housing outlet.

3. The debris containing device according to claim 2 in which: said pivotal mounting means includes:
   a pair of straps disposed on opposite sides of the housing;
   and means connected to said hopper and pivotally supported by said straps to pivotally connect said hopper to said straps.

4. The debris containing device according to claim 3 in which:
   the housing is mounted on a mobile frame;
   and each of said straps is connected to the frame.

5. The debris containing device according to claim 4 in which said pivotal mounting means has its pivot rearward of the housing outlet and adjacent the plane containing said bottom opening.

6. The debris containing device according to claim 4 in which said means connected to said hopper includes a U-shaped tubular member having each of its legs fixed to the hopper and its base pivotally supported by said straps.

7. The debris containing device according to claim 3 in which said means connected to said hopper includes a U-shaped tubular member having each of its legs fixed to the hopper and its base pivotally supported by said straps.

8. The debris containing device according to claim 3 in which said pivotal mounting means has its pivot rearward of the housing outlet and adjacent the plane containing said bottom opening.

9. The debris containing device according to claim 2 in which said pivotal mounting means has its pivot rearward of the housing outlet and adjacent the plane containing said bottom opening.

10. The debris containing device according to claim 1 in which said pivotal mounting means has its pivot rearward of the housing outlet and adjacent the plane containing said bottom opening.

* * * * *

UNITED STATES PATENT OFFICE
CERTIFICATE OF CORRECTION

Patent No. 3,923,340　　　　　　　　　Dated　December 2, 1975

Inventor(s) Charles W. Doering

It is certified that error appears in the above-identified patent and that said Letters Patent are hereby corrected as shown below:

Column 1, line 9, cancel "which"
　　　　　line 9, before "is" insert ---which---
　　　　　line 16, "3,841,043" should be ---3,849,043---

Column 2, line 22, "cutlet" should be ---outlet---

Column 5, line 38, "25" should be ---26---

Column 7, lines 13 to 19 should be indented as follows:

3. The debris containing device according to
claim 2 in which;
　　said pivotal mounting means includes:
　　　　a pair of straps disposed on opposite sides of
　　　　　the housing;
　　　　and means connected to said hopper and pivotally
　　　　　supported by said straps to pivotally connect
　　　　　said hopper to said straps.

Signed and Sealed this twenty-third Day of March 1976

[SEAL]

Attest:

RUTH C. MASON　　　　　　　　　　　C. MARSHALL DANN
*Attesting Officer*　　　　　　*Commissioner of Patents and Trademarks*